Jan. 8, 1952 A. T. JONES 2,582,039

AUTOMATIC TUNING DEVICE FOR RADIO BROADCASTING RECEIVERS

Filed July 21, 1948 4 Sheets-Sheet 1

Inventor

Addis T. Jones

By Wilfred E. Lawson

Attorney

Jan. 8, 1952 A. T. JONES 2,582,039

AUTOMATIC TUNING DEVICE FOR RADIO BROADCASTING RECEIVERS

Filed July 21, 1948 4 Sheets-Sheet 2

Inventor

Addis. T. Jones

By Wilfred Lawson

Attorney

Jan. 8, 1952 A. T. JONES 2,582,039

AUTOMATIC TUNING DEVICE FOR RADIO BROADCASTING RECEIVERS

Filed July 21, 1948 4 Sheets-Sheet 3

Inventor

Addis T. Jones

By Wilfred E. Lawson

ATTORNEY

AUTOMATIC TUNING DEVICE FOR RADIO BROADCASTING RECEIVERS

Filed July 21, 1948 4 Sheets-Sheet 4

Inventor
Addis T. Jones
By Wilfred E. Lawson
ATTORNEY

Patented Jan. 8, 1952

2,582,039

UNITED STATES PATENT OFFICE 2,582,039

AUTOMATIC TUNING DEVICE FOR RADIO BROADCASTING RECEIVERS

Addis T. Jones, Bainbridge, Md.

Application July 21, 1948, Serial No. 39,857

14 Claims. (Cl. 250—20)

This invention relates to automatic tuning devices for radio broadcast receivers and it has for its principal object to provide an apparatus or mechanism of this character having push button means for selecting the stations to be automatically tuned in by the mechanism and, at the same time, adjusting the mechanism in order to get the desired stations in timed sequence.

Another object of the invention is to provide a time operated or controlled mechanism by means of which previously selected broadcasting stations will be automatically tuned in at the proper time and in the proper order or sequence according to prior selection.

Still another object of the invention is to provide a time operated and controlled mechanism which can be preset for the automatic tuning in at the proper time of any one of a number of previously selected broadcasting stations at previously selected intervals such, for example, as intervals of fifteen minutes or one-half hour or whereby a particular selected station may be kept in operation for a desired period greater than the periods of operation for other preselected broadcasting stations.

A still further object of the invention is to provide a time controlled radio station selector apparatus for use in connection with any standard broadcast receiver which is push button or switch operated in connection with the setting of the mechanism for tuning in desired broadcasting stations.

Another object of the invention is to provide the new and novel combination of a selector apparatus and a radio receiver of AM, FM or television type having condenser or inductance controlled station selector circuits or combinations of the same, wherein the selector apparatus has movable elements which are advanced at proper intervals by clock control to close a previously determined selector circuit.

The invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

Figures 1, 3, 4:
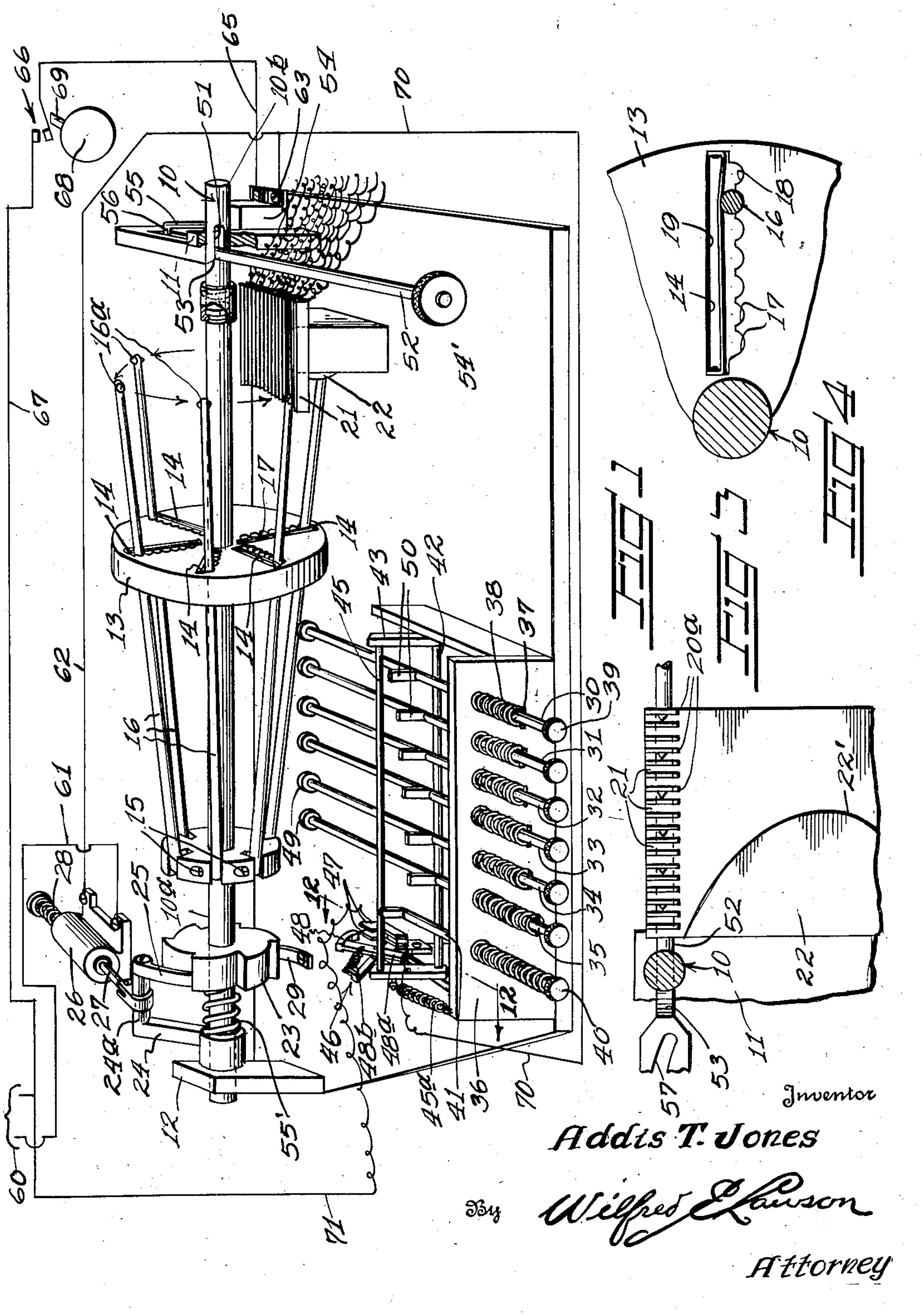
Figure 1 is a diagrammatic perspective view of a mechanism constructed in accordance with an embodiment of the present invention.
Figure 3 is a detail view on an enlarged scale illustrating diagrammatically a number of switch units together with the means for restoring the selector arms to off position.
Figure 4 is a detail view on an enlarged scale of a portion of the selector arm supporting disk showing the rests for a selector arm.

In accordance with the present invention, one embodiment of which is illustrated in Figures 1 to 7 and 12, there is provided a shaft or hub 10, here shown as in the two aligned sections 10a and 10b, which is supported at its ends by suitable bearing posts 11 and 12. This shaft or hub is supported by said posts to have limited axial movement, while the section 10a, which constitutes the major portion of the shaft or hub, is also designed to have unlimited rotary motion. Any suitable means may be employed for coupling the two sections together whereby the same may move axially together and the section 10a may rotate, the means here illustrated consisting of a sleeve secured to the section 10b and having the adjacent end of the section 10a rotatably supported therein.

Secured to and supported by the section 10a of the shaft 10, is a disk 13, in which are provided a number of radial slots 14, here shown as six. The number of slots may be arbitrarily selected in accordance with the length of time it is desired to have the apparatus function after being once set, without requiring further attention. If the number of slots represents receiving periods of fifteen minutes it will be seen that the number here shown will keep the apparatus functioning for an hour and one half. Obviously, this number may be increased or decreased as desired.

In spaced relation with the disk 13 there are supported by and around the hub or shaft 10 a like number of pivots 15, to each of which is attached and end of a selector arm 16. Each of the selector arms 16 is adapted by reason of its pivotal mounting 15 to have its other end swing in and out with respect to the hub.

Each of the selector arms 16 extends through and is supported in a slot 14.

Each of the slots 14 has located along one of its long sides, a number of seats or rests 17 equal in number to the number of stations which the device is designed to tune in. In addition to these rests 17 there is an additional one at the outer end of the series, which is designated 18 and in which the adjacent selector arm rests when it is in "off" position, by which is meant a position where it cannot function to close a station selector circuit.

Any suitable means may be employed for yieldingly maintaining the selector arms in any one of the seats or rests 17 or 18, there being here shown a long resilient or spring strip 19 which extends lengthwise of each slot 14 and which bears against the adjacent selector arm 16 to hold it in its seat but which yields under suitable pressure to let the rod move from one seat to the next.

Disposed in a line extending radially with respect to the shaft 10 and upon the side of the disk 13 remote from the pivotal mountings 15 for the selector arms are coacting pairs of contacts 21 which are arranged in an arc as illustrated, having a radius equal to the length of a selector arm or in other words, the arcuate arrangement of the contacts 21 corresponds with the arcuate path which the free end of any one of the selector arms 16 defines in swinging inwardly and outwardly around its pivot 15. This group of the pairs of contacts 21 is so positioned that as the shaft section 10*a* rotates in the proper direction, moving the selector arms with it, the free end of each selector arm will, when it reaches a predetermined position in its rotary movement and when resting in any one of the seats 17 move between and make electrical contact or connection with two contacts 21 forming a pair. This will result in the closing of one of several broadcast station selector circuits in the broadcast receiver, which have therein the usual condensers $C_1$ and $C_2$ or inductances (not shown) in place thereof or any combination of condensers or inductances or both.

At the same time that electrical connection is made between any pair of contacts 21 it is required that there also be established a ground and this is provided for by the current conductor 20 which is electrically connected with a series of resilient fingers 20*a*. One of these fingers is electrically coupled with a contact by the flexing of the latter upon the passage of the current conducting tip 16*a* of a selector arm between and in electrical connection with two contacts as illustrated diagrammatically in Figure 2.

If any one of the selector arms is in the outermost position or in the rest 18 it will not function to close a station selector circuit.

Figures 2, 5, 6, 7:
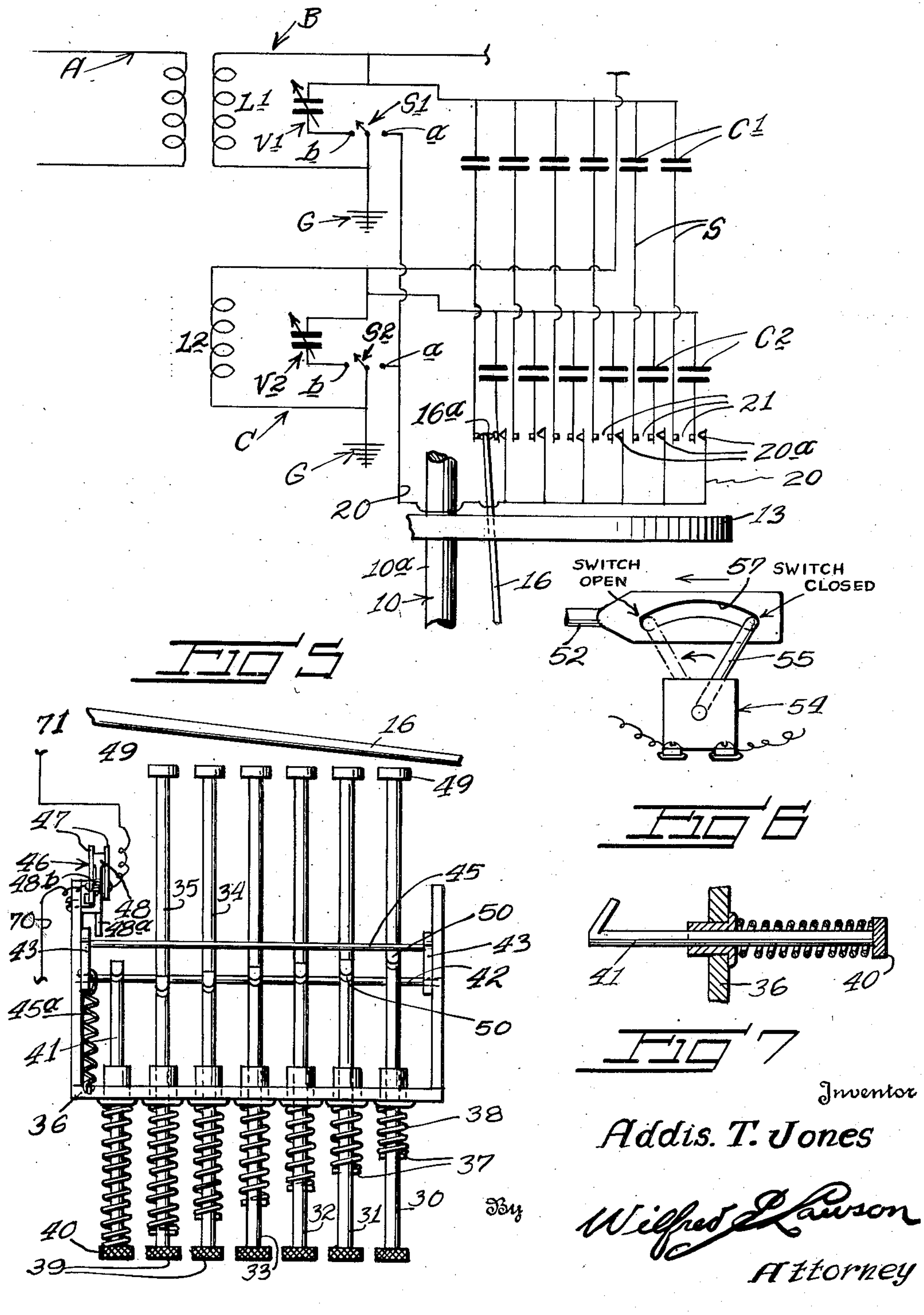
Figure 2 is a portion of a circuit diagram of a type with which the present invention is designed to be used.
Figure 5 is a detail view in top plan of the selector rods in association with one selector arm.
Figure 6 is a detail view of the automatically operated switch for opening the clock switch circuit.
Figure 7 is a detail view of the solenoid switch actuating rod.
Figures 8, 13:
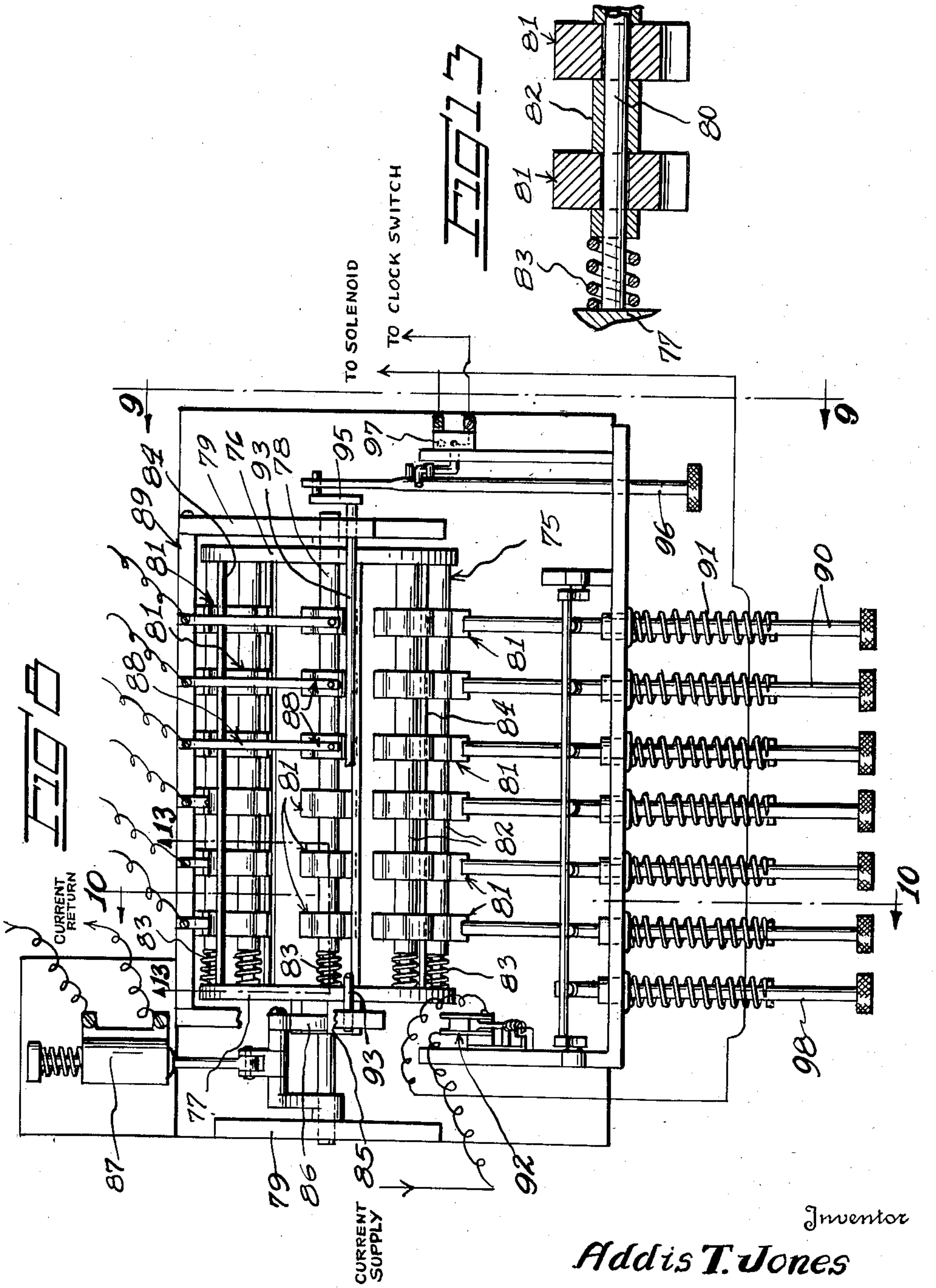
Figure 8 is a view in top plan of a modified embodiment of the invention, parts being broken away.
Fig. 13 is a detail section on an enlarged scale on the line 13—13 of Figure 8.
Figure 9:
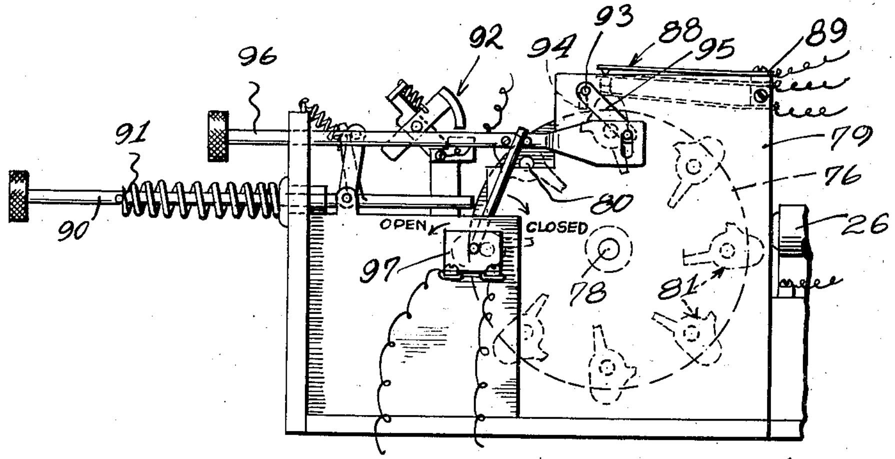
Figure 9 is a view in elevation of the end of the same as viewed from line 9—9 of Figure 8.

In the portion of a radio receiver circuit here here shown in Figure 2 for the purpose of illustrating the hook-up of the station selector circuits and the coaction therewith of the station selector arms, the reference A generally designates an antenna-ground system or pre-amplifier while the characters B and C designate respectively the frequency converter or mixer stage and the local oscillator stage. On the ground side of the tuning condenser in each stage there is interposed in the circuit a hand switch for cutting out the automatically controlled selector circuits and putting the variable condensers in circuit whereby manual tuning of the receiver may be had. These switches are designated $S_1$ and $S_2$ and the variable condensers are designated $V_1$ and $V_2$. When the switches $S_1$ and $S_2$ are on position *a* the selector arms are connected to the ground G of the receiver circuit by the conductor 20 and when such switches are on position *b* the receiver is set for manual tuning.

In the circuit diagram forming Figure 2, the automatic station selector circuits S are shown having therein fixed condensers $C_1$ and $C_2$, which is in accordance with standard practice. These condensers may be replaced with inductances of suitable character if desired by cutting out the inductances $L_1$ and $L_2$ and inserting condensers of fixed capacity to replace condensers $V_1$ and $V_2$. Such changes are standard and illustration of the same is not thought to be required.

After the passage of the necessary or desired time period that one selector arm is in electrical connection with a pair of contacts or terminals 21 and the device functions to move the next selector arm into contact with the same or another pair of terminals 21 to either maintain the same broadcasting and/or television station tuned in or to tune in another preselected broadcasting station, all as hereinafter described, the selector arm which is moved out of engagement with the terminals 21 has its free end brought, after necessary extent of movement with and around the axis of the shaft 10, into engagement with a curved or arcuate camming surface 22. This camming surface extends outwardly from the shaft 10 and curves sharply in the direction of movement of the selector arm and terminates adjacent to the inner side of the circular path followed by the seat or rest 18. Accordingly it will be seen that after the selector arm is moved out of engagement with a pair of contacts or terminals 21 and is eventually brought into contact with the camming surface 22, it will be gradually urged or shifted outwardly away from the shaft until it runs off of the outer end or high point 22' of the cam, at which time it will have reached its off position in the seat 13 where it will remain until it is again shifted into a station selecting position in the manner hereinafter described.

Secured upon the shaft section 10*a* is a ratchet wheel 23. Between this ratchet wheel and the adjacent bearing support or post 12 there is oscillatably mounted upon the shaft an arm 24 which has free swinging movement independently of the shaft and which at its upper end has the right angled extension 24*a*, upon the free end of which is oscillatably supported the pawl 25, the end of which is in contact with the toothed periphery of the ratchet wheel 23 whereby, when the pawl is oscillated in the proper direction, the wheel 23 will be turned and will impart turning movement to the shaft and the hereinbefore described elements carried thereby.

The numeral 26 designates a solenoid having an iron core or armature 27, one end of which is connected with the arm 24a. At the opposite end of the core 27 is a spring 28 which connects between the adjacent end of the core and the adjacent end of the coil and normally pulls the core outwardly or away from the pawl carrying arm 24a. When the solenoid is energized the armature or iron core will be shifted axially therethrough toward the arm 24a and will impart the necessary thrust to the arm and to the pawl to give the necessary rotational movement to the ratchet wheel.

The electrical connections for the solenoid will be hereinafter described.

Coacting with the ratchet wheel 23 is a spring tongue 29 which is fixed at one end and has the other end in contact with the teeth of the wheel and functions to prevent rotational movement of the ratchet wheel in the contrary direction to that which the wheel is given by the pawl 25 when the solenoid is energized.

For setting of the selector arm in the preselection of desired broadcasting stations to be brought in through the receiver with which the present apparatus is connected, there are provided push button operated selector rods of a number equal to the number of seats 17. In the present case since six seats have been illustrated there will be six of these selector rods and six buttons connected with the outer ends thereof. These rods are designated 30, 31, 32, 33, 34, and 35 and they are supported by a suitable panel, here designated 36, for reciprocatory movement. All of these selector rods are disposed in the same plane and are directed toward the shaft 10. By this arrangement it will be seen that each of the selector arms will come into the same plane as the selector rods and the shaft at one time during its movement around the axis of the shaft. When each selector arm reaches this position it can be made to swing on its pivot 15 to any one of the six station selector positions desired from its off position, by the projection of a selected one of the selector rods inwardly toward the selector arm.

Each of the selector rods 31 to 35 carries a stop member 37 which limits the extent to which it may be moved inwardly toward the selector arm so that no one of the selector rods can move a selector arm beyond a predetermined position.

Suitable spring elements 38 are provided for returning the selector rods to starting position and each of the selector rods has a head or button 39 to facilitate its inward projection.

It will be readily apparent that each of the selector rod buttons will be marked with the call letters of a broadcasting station and the terminals 21 will be suitably connected with the radio receiving set selector circuits as already described, so that when the selected button is pushed in the selector arm will be shifted to the proper seat 17 and held in position to be brought into contact with the proper terminals 21 when the shaft section 10a and the parts carried thereby have rotated to the proper extent.

In addition to the selector rods which are actuated by push buttons 39, there is a push button 40 which operates a short rod 41 in a manner about to be described, to allow for the continued operation of the mechanism without the tuning in of a broadcasting station in the receiving circuit with which the mechanism is associated.

Extending transversely across the selector rods 30 to 35 and the program changer rod 41, is a rock shaft or bar 42 which is suitably oscillatably supported at its two ends. Such bar has connected therewith the two spaced arms 43. Between the upper ends of these arms 43 is a bar 45 which parallels the rock shaft 42. The selector rods 30 to 35 pass between the bars 42 and 45.

Suitably positioned adjacent to the bar 45 to be actuated by the bar when the latter is moved around the center of the lower pivot bar 42, is a solenoid control switch which is generally designated 46. This switch is shown as having the two spaced terminals 47 which are designed to be bridged or electrically coupled by the current conducting blade 48 which is carried by a pivotally supported rock arm 48a. The end of the rock arm opposite from that end which carries the blade 48, is maintained in a central or neutral position, by means of a spring 48b, in the path of rocking movement of the bar 45. With this arrangement when the bar 45 is swung forwardly and downwardly it will strike the free end of the arm 48a to swing the arm in a direction to move the blade 48 away from the switch points, moving past and freeing the free end of the arm. When this bar is swung back or pulled back under the action of the tensioned spring 45a it will again strike the free end af the arm 48a but upon the underside and will cause this arm to swing in a direction to move the switch blade 48 between the points 47 thereby electrically coupling these points. At the same time the spring 48b will be placed under tension so that after the bar 45 has swung to a point where it frees the free end of the arm 48a the spring 48b will pull the arm 48a back to neutral position.

Each of the selector rods 30 to 35 carries upon its inner end a pusher foot 49 which is adapted to push against a selector arm when an arm has been brought into the proper plane to be oscillated by a selector rod in the manner previously described.

Each of the button operated selector rods 30 and 35 carries an upstanding finger 50 which when moved to the necessary extent with the selector rod engages the solenoid switch operating bar 45 and rocks the bar downwardly in the manner previously described. Thus if the selector rod 32, for example, is being actuated to shift a selector arm 16 out of its "off" position to a station selector position, the selector arm will be swung inwardly until it reaches the third seat 17 from the outer end of the row of seats. After the selector arm has been positioned in the desired seat it is released and upon its return under the act of the spring 38 the bar 45 will be swung back by the spring 45a in the manner previously described and will operate to close the switch 46. The solenoid 26 will then be energized and will function to move the pawl 25 in a direction to apply thrust to the ratchet wheel 23 and the shaft section 10a and parts carried thereby will be turned one step. This will bring the next selector arm into position in line with the selector rods 31 to 35.

At the end of the shaft 10 remote from the ratchet wheel 23 the shaft section 10b is provided with a transverse slot 51 through which extends a shaft shifter rod 52 which carries a cam surface 53. This rod 52 when pulled out by means of the button 54', which is carried upon its outer end, brings the cam 53 into contact with the adjacent edge of the slot 51 and effects shifting of the shaft 10 to the left against the tension of a spring 55' which encircles the shaft section 10a and is interposed between the ratchet wheel 23 and the arm 24.

Positioned adjacent to the shaft shifter rod 52 is a switch unit 54 which is opened and closed by the movement of a pivotally supported oscillatable arm 55. This arm carries a lateral finger 56 which engages in a slot 57 formed longitudinally in the rod 52. When the rod 52 is pushed in so that the control spring 55′ effects the movement of the shaft 10 to the right, the switch finger 56 will be engaged against one end of the slot 57 and oscillated to close the switch 54. When the rod 52 is pulled out the cam 53 will function to effect the axial shifting of the shaft 10 against the action of the spring 55′ and thereby move all of the selector arms 16 to the left, to positions where the ends of these arms cannot come into engagement with the circuit closing terminals 21 when the shaft section 10a is rotated. As the rod 52 is pulled out the other end of the slot 57 engages the switch finger 56 and effects the opening of the switch 54.

The numeral 60 designates the current supply conductors by which electric current is carried to and from the electrical elements of the apparatus. As shown one of these lines runs to one side of the solenoid 26 through the conductor 61 and connected with the other side of the solenoid is a conductor 62 which connects with the terminals 63 forming one side of the switch 54. The other side of this switch 54 is connected by the conductor 65 with one side of the automatic clock operated switch 66 and the other side of this automatic switch is connected by the conductor 67 with the input side of the supply circuit 60.

The present apparatus is designated to be operated by either an electric or a spring clock and there is accordingly provided a wheel or gear 68 which is operatively coupled with the clock so as to make one revolution each fifteen minutes. This gear 68 functions as a switch closing means for the mechanical switch 66 and is, for this purpose, provided with a suitable spur or finger 69 which closes the switch 66 upon each revolution of the gear. Accordingly, it will be seen that when the switch 54 is closed a current impulse will be sent through the solenoid 26 every fifteen minutes which is the shortest period which the majority of programs run, so that the program will be changed if desired at such intervals.

The terminal 63 of switch 54 is also electrically connected by the conductor 70 with one of the terminals 47 of the solenoid switch 46. The other side or terminal 47 of the solenoid switch 46 is electrically connected by the conductor 71 with the input side of the current supply circuit.

In the operation of the present apparatus, when it is to be set for the automatic selection or tuning in of the desired stations the shaft shifter rod 52 is pulled out and this will first effect the axial shifting of the shaft as previously stated. The movement of the shaft, of course, moves the free ends of the selector arms 16 away from the pairs of contacts 21 so that the setting of the arms 16 by the selector rods can be accomplished. This will also effect the opening of the switch 54 cutting out the clock switch from one solenoid circuit, so that if the switch 66 should be closed the solenoid will not be energized by this means during the manipulation of the selector rods 30—35.

After all of the selector arms have been moved with the shaft axially, they can be set in their station selector positions. As previously explained, this is done by the manipulation of the selector rods 31—35, each of these selector rods shifting a selector arm inwardly to the desired position when such arm is in the plane of the selector rods. Accordingly the first selector arm to be set will also be the first one to tune a station after the setting of all the six selector arms has been accomplished. Where, of course, the period which a selected station is broadcasting, exceeds fifteen minutes, two, three or four of these selector arms may be set for the same station and thus when the automatic switch 66 is closed the next selector arm 16 will move up and close the same station selector circuit as that closed by the preceding arm to thus keep the same station tuned in.

After each selector rod has been pushed and set a selector arm the switch 46 will be closed as the rod moves out so as to energize the solenoid thru the other circuit, which comprises conductors 61, 62, 70 and 71, causing the turning of the shaft, disc and selector arm 16 one step to bring the next selector arm into position for setting by means of a selector rod.

If, for any reason, it is desired to turn the shaft and selector arms without moving an arm out of its off position, or, in other words, to a station selector position in one of the rests 17, use may be made of the short push rod 41. This rod only extends to and engages the bar 45 and accordingly functions only to effect the closing of the solenoid switch 48.

While there has been shown and described one embodiment of the invention or a preferred means by which the objects of the invention may be carried out, other means may be made use of for accomplishing the objects set forth.

Such another means is disclosed in Figures 8 to 11 and 13 of the drawings wherein the rotatable member or unit takes the form of a circular or cylindrical cage which is generally designated 75. The cage referred to comprises a pair of end plates or disks which are designated 76 and 77, mounted upon a shaft 78 which in turn is supported at its ends by the posts 79.

Connecting the end plates or disks 76 and 77 and positioned adjacent to the peripheries thereof, are a number of bars 80 which are analagous to the selector arms 16 in that each represents a period of time during which a selected station will remain tuned in and after the passage of such time period the cage will be rotated one step and another bar will come into position to effect, by means hereinafter described, the closing of a selector circuit controlling switch.

Each of the bars 80 carries thereon a number of switch closing fingers each of which is designated 81. These fingers are separated by suitable spacers 82 and at one end of each rod 80 is a spring 83 which constantly urges the fingers 81 and spacers into relatively tight frictional contact so that any one of the fingers will remain in the position in which it may be oscillated on its supporting rod.

The fingers 81 upon each rod 80 are analagous to the rests 17 in each of the slots 14 in that each finger represents a particular broadcasting station and functions, when in set position, to close the necessary circuit for selecting that broadcasting station or tuning in the same.

Each of the fingers 81 functions somewhat in the nature of a cam in that it has a high point *a* which, when in the proper position, performs the necessary work of closing a switch. Each finger also includes a tail piece *b* which is directed oppositely to the point *a*, and intermediate between the point *a* and the tail *b* and extending generally in a line transversely of a line drawn through *a* and *b*, is a rest finger *c*.

Paralleling each rod 80 and in front thereof or spaced therefrom in the direction of movement of the finger, is a rest bar 84, upon which rests the ear *c* when the selector finger is in raised or set position.

Connected with the shaft 78 is a ratchet wheel 85 and operatively coupled with this wheel is an actuating pawl or dog 86 which is moved by an electric solenoid 87 under the same conditions as the pawl 25 is operated by the solenoid 26 when the latter is energized.

Since it will be readily obvious that the solenoid 87 may be connected in the same circuits and operated by a timing mechanism of the same character as shown in Figure 1 no illustration of the circuits of the timing mechanism has been shown or is thought to be required.

Supported in a suitable manner adjacent to the rotary structure 75 are a number of switches 88 which correspond to the switches 21. These switches, like switches 21, consist of two terminal blades 88*a* which are brought into electrical connection, and are here shown as supported upon a rail 89 which is disposed above and parallels the cage 75. There may also be associated with the blades 88*a*, a third blade 88*b* corresponding to blade 20*a*, to function to ground the station selector circuits as may be required, or to connect in another selector circuit. Each switch 88 is disposed above and in the vertical plane of a circular series of the fingers 81, and is so positioned that any one of the fingers in a series, when it is oscillated to station selector position, will close the overlying switch when it is brought around to the proper position in the rotation of the cage, to effect the energization of the desired selector circuit.

Corresponding in number with the number of switch closing fingers 81 upon each rod 80, are selector rods 90 which are suitably supported for reciprocatory movement. Each of these selector rods lies in the vertical plane of a circular series of the fingers 81. Also the selector rods of the group lie in the same horizontal plane and in such position that when each of the rods 80 is brought around to the proper position with respect to this horizontal plane the inward extension of any one of the selector rods will cause its inner end to engage the tail piece of a finger 81 and effect the oscillation or rocking of that finger on its supporting rod, to a raised or set position.

Figures 11, 12:
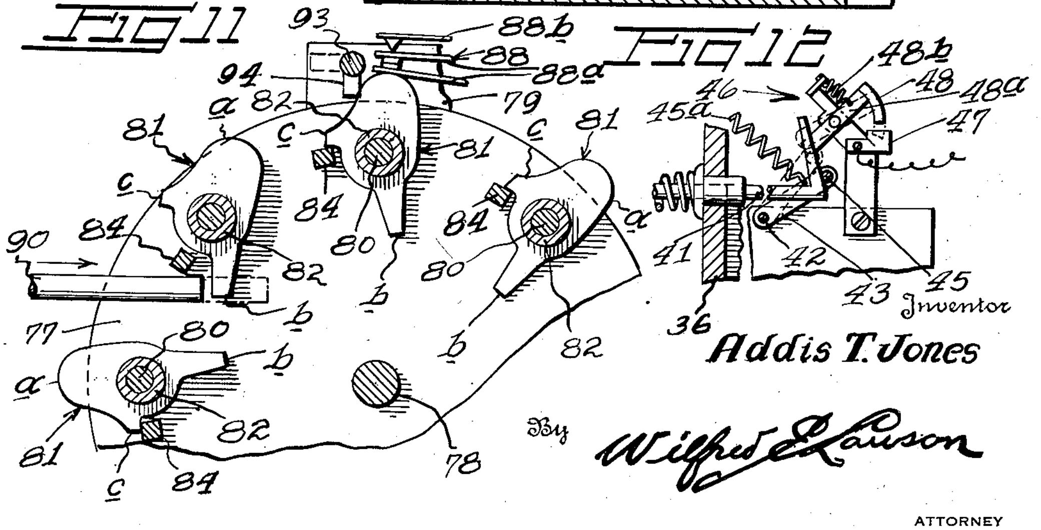
Figure 11 is a detail section on an enlarged scale corresponding to a portion of the section of Figure 10.
Figure 12 is a sectional detail taken substantially on the line 12—12 of Figure 1.

When a finger is oscillated to raised or set position it will momentarily close the adjacent selector circuit control switch 88 as shown in Figure 11, but such closing of the circuit will only be momentary for the reason that as soon as the selector rod is released to return to its normal position under the action of the control spring 91 the solenoid switch 92 will be momentarily closed to effect the energization of the solenoid 87 and the rotation of the cage unit 75 one step to bring another group of fingers 81 into position where one thereof may be set by the actuation of the desired selector rod.

For the throwing out of the set fingers 81 after the mechanism has functioned and the fingers have performed their duties there is provided at the forward side of the series of switches 88, that is, the side facing the direction in which the fingers move on rotation of the cage, a rock shaft 93 which carries a plurality of depending tongues 94 which during the automatic operation of the mechanism, hang down in the path of movement of the raised ends of the fingers 81. Thus after all of the stations have been selected and the mechanism is set in operation, as each of the set fingers 81 moves away from the switch 88 the raised end portion *a* will come into contact with a depending tongue 94 and will be rocked back into its off position.

During the operation of preselecting the stations which are to be automatically tuned in by the mechanism, it is necessary that the finger actuating tongues 94 be shifted to an out of the way position. Accordingly, one end of the rock shaft 93 is provided with a connection in the form of a crank arm 95, with a reciprocable throw-out rod 96 which is supported for rectilinear movement.

This throw-out rod is also operatively connected with a switch 97 which functions in the same manner as the switch 54 to cut out the clock-operated switch from the solenoid circuit while the fingers are being set.

As will be readily seen, the same clock and solenoid circuits may be used as were described in connection with the first embodiment of the invention and accordingly it will be apparent that when the clock switch is cut out of the solenoid circuit, the solenoid switch 92 can still function to energize the solenoid to effect the desired step-by-step movement of the cage unit 75 with each reciprocation of a selector rod.

The means employed for closing the solenoid switch 92 each time a selector rod is operated, is the same as that described in connection with the first embodiment and is therefore believed that a repetition of description of this apparatus is not necessary to a proper understanding of the operation of the mechanism.

In addition to the foregoing it will be understood that use may be made of a solenoid switch closing rod 98 of the same form and operating in the same way as the rod 41.

In the operation of the second embodiment of the invention the operator first pulls out the throw-out rod 96. This swings the rock shaft to move the tongues 94 to an elevated position so that they will not be engaged by any raised or set finger as the cage unit rotates. The fingers 81 at this time will all be down. As previously stated, the outward movement of the rod 96 will also open the switch 97 to disconnect the clock operated switch from the solenoid circuit.

With each step movement of the cage unit a finger carrying rod 80 will be brought into position beneath the series of switches 88. Accordingly when one of the selector rods 90 is pressed in, the inner end of the rod will engage the tail piece *b* of a finger, all of the fingers being down, of course, when the selections are made, and swing that finger to raised position where the end *a* will close the overlying switch 88. As has also been previously stated, this closing of the switch will be only momentary, because when the rod 90 is released the solenoid switch 92 will be closed and the solenoid will become effective to turn the cage unit one step to bring the next finger carrying rod 80 into position beneath the switches 88 where one of the fingers can be actuated by a selector rod. This operation is repeated for each finger carrying rod 80, one finger of each rod being raised or set in position, or, if a broadcast period is to be skipped, the rod 98 will be pushed in to close the solenoid switch 92 thus moving the finger carrying rod 80 forward without changing the downward position of any of the fingers 81.

Figure 10:
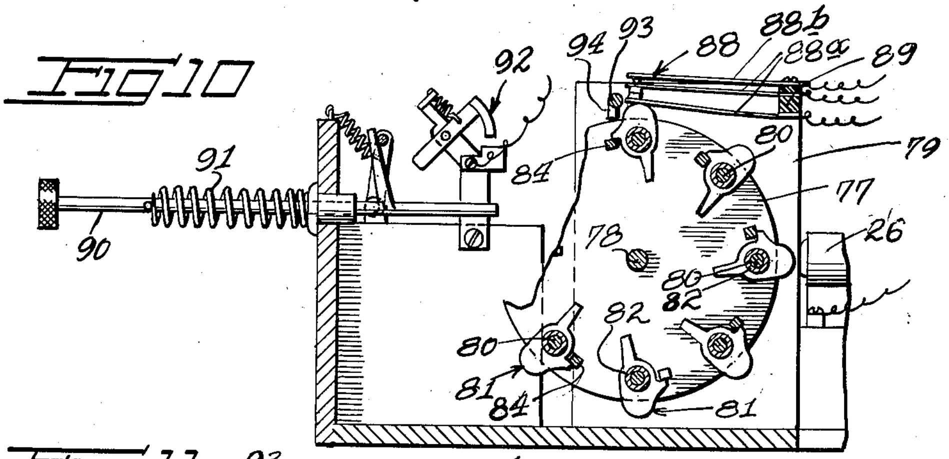
Figure 10 is a transverse section taken substantially on the line 10—10 of Figure 8.

After all of the fingers have been set as desired, the throw-out rod 96 is pushed back and this will then put the clock operated or timing switch back into circuit with the solenoid and will also lower the finger kick-out tongues 94 to the position shown in Figures 10 and 11. Thus when a finger has come into position to close a switch 88 and the fifteen minute time period has passed so that the clock switch is closed and the solenoid operated to move the next selector circuit switch closing finger into position, the finger 81 which is moved on away from its switch 88 will, in such forward movement, strike the adjacent depending tongue 94 and be oscillated back to its down position.

In connection with the circuit arrangement shown in Figure 2, it is to be understood that if one or more preamplification stages are needed, or if three or more contacts must be closed for any reason as, for example, in a television circuit, in a similar manner that switches 21 are now closed, additional circuits of fixed selected stations can be hooked in with the selector arms 16 closing three or more circuits at one time. Since this change is one which would be obvious to anyone versed in the art an illustration of the features referred to has not been made as it is not thought to be necessary.

In the circuit arrangement of Figure 2, also, the additional switch points 20*a* have been shown connected with a ground, whereby the necessary ground connection is established or any other electrical circuit may be used, upon the closing of the switches 21 but it will be understood here that if such ground connections are not required, these additional switch points may be employed for closing additional circuits, as set forth.

It is also to be understood that wherever in the specification or claims "radio circuit" or "receiver circuit" is referred to without qualification it is intended that this be understood as applying to AM or FM or television receiver circuits.

I claim:

1. A time controlled apparatus for tuning a radio receiver to preselected wave lengths, comprising a rotatable member, a number of elements carried by said member for movement therewith in a circular path and pivotally supported thereon for swinging movement in a direction transversely to the said circular path, a plurality of reciprocable station selectors, each selector being movable to swing an element to a selected one of a number of locations in the said direction of movement, means for imparting a rotary movement to the rotatable member at determined timed intervals, and means by which each selectively located element effects the tuning of a circuit in the receiver to the preselected wave length when such element reaches a predetermined position in its circular path.

2. A time controlled apparatus for tuning a radio receiver to preselected wave lengths, as set forth in claim 1, with means for automatically reversely swinging each of said elements in a direction transversely of the said circular path after such elements have moved past the said predetermined position.

3. A time controlled apparatus for tuning a radio receiver to preselected wave lengths, as set forth in claim 1, wherein the said elements are in the form of relatively long arms each pivoted at one end for swinging movement in the said direction transversely to the said circular path and the said station selectors being equal in number to said arms and each adapted to effect the swinging of any one arm a fixed distance.

4. A time controlled apparatus for tuning a radio receiver to preselected wave lengths, comprising a shaft supported rotatable member, a number of elements carried by said member to move therewith in a circular path and pivotally supported thereon for swinging movement in a direction transversely to the said circular path, means for selectively swinging each element to a selected one of a number of locations in the said direction of movement, a solenoid operated pawl and ratchet means connected with said member shaft for imparting a step by step rotary movement to the rotatable member, an electric circuit for said solenoid, time operated means for electrically energizing said circuit at prescribed intervals, and means by which each selectively located element effects the tuning of a circuit in the receiver to the preselected wave length when such element reaches a predetermined position in its circular path.

5. A time controlled apparatus for tuning a radio receiver to preselected wave lengths, comprising a plurality of selector arms, a carrier therefor, means supporting the carrier for rotation, a plurality of groups of rests on said carrier for movement therewith in a circular path around the axis of rotation of the carrier, a pivotal coupling between an end of each selector arm and the carrier supporting means whereby each arm is swingable in a direction transverse to said circular path, each of said arms being positioned for movement over and for selective engagement in a rest of a group, a plurality of terminals for connection in tuning circuits of a radio receiver, there being a rest for each terminal, said plurality of terminals being so arranged that one thereof will be electrically connected by an arm preset in a rest, at one position in the rotary movement of the arm, means for selectively setting each arm in one of the rests of the group with which it is associated, and clock controlled electrically operated means for imparting a step by step rotation to the carrier and arms.

6. A time controlled apparatus for tuning a radio receiver to preselected wave lengths, as set forth in claim 5, wherein the said means for selectively setting each arm comprises a push rod, means for establishing an operative coupling between a push rod, means for establishing an operative coupling between a push rod and the arm when the arm is brought into the plane of the rod, and means for advancing the carrier and arm one step at the completion of the movement of the arm setting rod.

7. A time controlled apparatus for tuning a radio receiver to preselected wave lengths, as set forth in claim 5, wherein the said means for supporting the carrier for rotation comprises a shaft and the clock controlled electrically operated means comprises a ratchet wheel carried by the shaft, a pawl operatively coupled with the ratchet wheel, an arm carrying the pawl and rockable on the axis of the shaft and an electric solenoid having a reciprocable core operatively connected with said pawl arm.

8. A time controlled apparatus for tuning a radio receiver to preselected wave lengths, as set forth in claim 5, wherein one of the said rests of each group is positioned to maintain the adjacent selector arm in an off position where it will miss contact with a tuning circuit terminal, and means for automatically shifting each selector arm to said last mentioned rest after the arm has made contact with and moved away from the tuning circuit terminal which it was set to engage.

9. A time controlled apparatus for tuning a radio receiver to preselected wave lengths, comprising a rotatably mounted shaft, a disk secured to the shaft to turn therewith, the disk having a plurality of slots therein, means extending lengthwise of each slot forming a row of seats, a plurality of selector arms each pivotally joined to the shaft and each extending through a slot, the arms being designed to turn with the disk and shaft and also being swingable in a direction transversely to the path of turning movement for selective disposition in the adjacent seats, all of said seats but one representing a station tuning position for the adjacent arm, the said one seat representing the off position for the arm, a plurality of terminals corresponding in number to the number of seats representing the on positions for the arm, said terminals being so grouped with respect to the paths of movement for the arms that each arm will electrically contact a terminal as it moves past the group of terminals when it is engaged in one of the said seats representing a station selector position for the arm, electrically operated means connected with the shaft and which when electrically energized effects a prescribed rotational movement to the shaft, a time clock controlled electric circuit for said electrically energized means for energizing said means at selected intervals, a plurality of reciprocable station selector bars each adapted to engage and move a selector arm to a desired seat when such arm is brought into the plane of the bars, each of the bars having a different extent of movement from the others, and means for energizing said electrically operated means when any one of the selector bars is moved in the shifting of a selector arm whereby a partial rotation of the shaft will be effected to move another selector arm into position for engagement by a selector rod.

10. A time controlled apparatus for tuning a radio receiver to preselected wave lengths, as set forth in claim 9, with means for axially shifting the shaft and selector arms away from the terminals preparatory to setting the selector arms by the shiftable selector rods.

11. A time controlled apparatus for tuning a radio receiver to preselected wave lengths, as set forth in claim 9, with means engaged by the selector arms after the arms have engaged and been moved away from the terminals, for shifting the selector arms to the said one of the seats of the adjacent group.

12. A time controlled apparatus for tuning a radio receiver to preselected wavelengths, comprising a plurality of switch units each designed for electrical connection with a condenser or inductance controlled station selector circuit of a broadcast receiver, a rotatable unit adjacent to said switch unit and comprising a circular series of switch closing fingers for each switch unit, each of said fingers being oscillatable between two positions identified as "off" and "on" positions, each finger when in "on" position being adapted, when moved to the proper extent as a part of the rotatable unit, to close a switch unit, means for moving a finger from "on" to "off" position following movement of the finger out of switch closing position, time controlled means for turning the rotatable unit a predetermined part of a revolution at timed intervals, means for oscillating a finger of any series to "on" position for presetting the fingers in station selecting position, and means for automatically turning the rotatable unit to the said predetermined part of a revolution upon completion of presetting a finger in "on" position.

13. A time controlled apparatus of the character described in claim 12 wherein the last mentioned means comprises an electrical element operatively coupled with the rotatable unit for turning such unit the said predetermined part of a revolution upon energization, a reciprocable member adapted when moved in one direction to engage and preset a finger in station selecting position, a switch element which when closed effects the energization of said electrical element, and means operated by said reciprocable member for closing said switch element following the action of presetting the finger.

14. A time controlled apparatus of the character stated in claim 12 wherein the said means for moving a finger from "on" to "off" position following movement of the finger out of the switch closing position, comprises a shiftable trip member arranged in the path of movement of the finger as it moves out of switch closing position, a solenoid having a shiftable core, an operative coupling between said core and the rotatable unit whereby upon energization of the solenoid the said rotatable unit will be turned the said predetermined part of a revolution, said time controlled means including an electric switch which when closed effects the energization of said solenoid, the said means for oscillating a finger to "on" position comprising a reciprocable rod, a second electric switch which when closed effects the energization of said solenoid, means operated by the reciprocable rod for closing the second electric switch after completion of presetting the finger, and means for shifting the finger trip means out of the path of the finger and for simultaneously opening the first switch preparatory to the presetting of the fingers in station selecting position.

ADDIS T. JONES.

REFERENCES CITED

The following references are of record in the file of this patent:

UNITED STATES PATENTS

| Number | Name | Date |
|---|---|---|
| 2,029,909 | Cassell | Feb. 4, 1936 |
| 2,068,227 | Cutler et al. | Jan. 19, 1937 |
| 2,275,650 | Porter et al. | Mar. 10, 1942 |
| 2,410,724 | Elliot | Nov. 5, 1946 |
| 2,463,290 | Loli et al. | Mar. 1, 1949 |
| 2,501,274 | Hamilton | Mar. 21, 1950 |